(12) United States Patent
Jha et al.

(10) Patent No.: US 10,474,667 B2
(45) Date of Patent: Nov. 12, 2019

(54) METHODS AND SYSTEMS TO DETECT AND CORRECT OUTLIERS IN A DATASET STORED IN A DATA-STORAGE DEVICE

(71) Applicant: VMWARE, INC., Palo Alto, CA (US)

(72) Inventors: Chandrashekhar Jha, Bangalore (IN); Jobin George, Bangalore (IN); Prateek Sahu, Bangalore (IN); Kumar Gaurav, Bangalore (IN); Jusvinder Singh, Bangalore (IN)

(73) Assignee: VMware, Inc, Palo Alto, CA (US)

( * ) Notice: Subject to any disclaimer, the term of this patent is extended or adjusted under 35 U.S.C. 154(b) by 141 days.

(21) Appl. No.: 15/811,710

(22) Filed: Nov. 14, 2017

(65) Prior Publication Data
US 2019/0034473 A1    Jan. 31, 2019

(30) Foreign Application Priority Data

Jul. 29, 2017   (IN) ............................ 201741027021

(51) Int. Cl.
| | |
|---|---|
| *G06F 16/23* | (2019.01) |
| *G06F 3/06* | (2006.01) |
| *G06F 16/25* | (2019.01) |
| *G06F 16/22* | (2019.01) |
| *G06F 16/951* | (2019.01) |

(52) U.S. Cl.
CPC ........ *G06F 16/2365* (2019.01); *G06F 3/0653* (2013.01); *G06F 16/221* (2019.01); *G06F 16/25* (2019.01); *G06F 16/951* (2019.01)

(58) Field of Classification Search
None
See application file for complete search history.

(56) References Cited

U.S. PATENT DOCUMENTS

| | | | |
|---|---|---|---|
| 2013/0202217 A1* | 8/2013 | Pavlovich | G06T 11/008 382/218 |
| 2014/0168418 A1* | 6/2014 | Hess | G01N 21/95607 348/126 |
| 2014/0310235 A1* | 10/2014 | Chan | G06F 9/4881 707/603 |
| 2015/0372966 A1* | 12/2015 | Seth | H04W 4/021 709/224 |
| 2017/0017901 A1* | 1/2017 | Firooz | G05B 13/0265 |
| 2017/0256056 A1* | 9/2017 | Jain | G06T 7/143 |
| 2017/0339168 A1* | 11/2017 | Balabine | G06F 16/951 |

* cited by examiner

*Primary Examiner* — Wilson Lee

(57) ABSTRACT

Methods and systems are directed to detection and correction of outliers in a dataset stored in a data-storage device. The dataset comprises parameter data that may be stored and organized in the form of a data table with rows and columns of parameter values. Each column of the parameter data is searched for outlier parameter values based on the parameters values in the same column. The parameter data as a whole may be searched for outlier rows of parameter values based on first and second largest variations in the parameter data. Substitute parameter values are determined for the outlier parameter values based on non-outlier parameter values of the parameter data. The substitute parameter values and corresponding outlier parameter values may be displayed in a database management user interface that enables a user to selectively accept or reject each of the substitute parameter values for the corresponding outlier parameter values.

18 Claims, 19 Drawing Sheets

| Server Model Name | Server ID | # Racks | CPU Model | # CPUs | RAM (GB) | # Nics | Price ($) |
|---|---|---|---|---|---|---|---|
| Server Model A | 123SD1 | 2 | CP-431 | 1 | 8 | 3 | 3480 |
| Server Model A | 123SD2 | 2 | CP-431 | 1 | 8 | 3 | 4132 |
| Server Model A | 123SD3 | 2 | CP-432 | 1 | 16 | 3 | 5139 |
| Server Model A | 123SD4 | 2 | CP-432 | 1 | 16 | 3 | 4569 |
| Server Model A | 123SD5 | 2 | CP-442 | 2 | 24 | 3 | 5149 |
| Server Model A | 123SD6 | 2 | CP-442 | 2 | 48 | 3 | 5231 |
| Server Model A | 123SD7 | 2 | CP-442 | 2 | 348 | 3 | 5789 |
| Server Model A | 123SD8 | 2 | CP-442 | 2 | 64 | 3 | 31328 |

$$X = \begin{bmatrix} x_{1,1} & x_{1,2} & x_{1,3} & \cdots & x_{1,p} \\ x_{2,1} & x_{2,2} & x_{2,3} & \cdots & x_{2,p} \\ x_{3,1} & x_{3,2} & x_{3,3} & \cdots & x_{3,p} \\ \vdots & \vdots & \vdots & & \vdots \\ x_{n,1} & x_{n,2} & x_{n,3} & \cdots & x_{n,p} \end{bmatrix}$$

$$\downarrow \quad \downarrow \quad \downarrow \quad \quad \downarrow$$
$$\mu_1 \quad \mu_2 \quad \mu_3 \quad \quad \mu_p$$

FIG. 7B $$Y = \begin{bmatrix} x_{1,1}-\mu_1 & x_{1,2}-\mu_2 & x_{1,3}-\mu_3 & \cdots & x_{1,p}-\mu_p \\ x_{2,1}-\mu_1 & x_{2,2}-\mu_2 & x_{2,3}-\mu_3 & \cdots & x_{2,p}-\mu_p \\ x_{3,1}-\mu_1 & x_{3,2}-\mu_2 & x_{3,3}-\mu_3 & \cdots & x_{3,p}-\mu_p \\ \vdots & \vdots & \vdots & & \vdots \\ x_{n,1}-\mu_1 & x_{n,2}-\mu_2 & x_{n,3}-\mu_3 & \cdots & x_{n,p}-\mu_p \end{bmatrix} = \begin{bmatrix} y_{1,1} & y_{1,2} & y_{1,3} & \cdots & y_{1,p} \\ y_{2,1} & y_{2,2} & y_{2,3} & \cdots & y_{2,p} \\ y_{3,1} & y_{3,2} & y_{3,3} & \cdots & y_{3,p} \\ \vdots & \vdots & \vdots & & \vdots \\ y_{n,1} & y_{n,2} & y_{n,3} & \cdots & y_{n,p} \end{bmatrix}$$

FIG. 7C $$\Sigma(t)\begin{bmatrix} E^1 & E^2 & E^3 & \cdots & E^p \end{bmatrix} = \begin{bmatrix} \lambda^1 & & & & \\ & \lambda^2 & & & \\ & & \lambda^3 & & \\ & & & \ddots & \\ & & & & \lambda^p \end{bmatrix} \begin{bmatrix} E^1 & E^2 & E^3 & \cdots & E^p \end{bmatrix}$$

714 — (left matrix label); 712 — (diagonal matrix); 714 — (right matrix label)

FIG. 7D $$\begin{bmatrix} E^1 & E^2 & E^3 & \cdots & E^p \end{bmatrix} \longrightarrow \begin{bmatrix} E_1 & E_2 & E_3 & \cdots & E_p \end{bmatrix}$$

$\lambda_1 > \lambda_2 > \lambda_3 > \cdots > \lambda_p$ 714, 716

FIG. 7E $$LD = \begin{bmatrix} \sqrt{\lambda_1}E_1 & \sqrt{\lambda_2}E_2 & \sqrt{\lambda_3}E_3 & \cdots & \sqrt{\lambda_p}E_p \end{bmatrix} = \begin{bmatrix} \sqrt{\lambda_1}e_{1,1} & \sqrt{\lambda_2}e_{1,2} & \sqrt{\lambda_3}e_{1,3} & \cdots & \sqrt{\lambda_p}e_{1,p} \\ \sqrt{\lambda_1}e_{2,1} & \sqrt{\lambda_2}e_{2,2} & \sqrt{\lambda_3}e_{2,3} & \cdots & \sqrt{\lambda_p}e_{2,p} \\ \sqrt{\lambda_1}e_{3,1} & \sqrt{\lambda_2}e_{3,2} & \sqrt{\lambda_3}e_{3,3} & \cdots & \sqrt{\lambda_p}e_{3,p} \\ \vdots & \vdots & \vdots & & \vdots \\ \sqrt{\lambda_1}e_{p,1} & \sqrt{\lambda_2}e_{p,2} & \sqrt{\lambda_3}e_{p,3} & \cdots & \sqrt{\lambda_p}e_{p,p} \end{bmatrix}$$

718, 720, 722

FIG. 7F $$YLD = \begin{bmatrix} y_{1,1} & y_{1,2} & y_{1,3} & \cdots & y_{1,p} \\ y_{2,1} & y_{2,2} & y_{2,3} & \cdots & y_{2,p} \\ y_{3,1} & y_{3,2} & y_{3,3} & \cdots & y_{3,p} \\ \vdots & \vdots & \vdots & & \vdots \\ y_{n,1} & y_{n,2} & y_{n,3} & \cdots & y_{n,p} \end{bmatrix} \begin{bmatrix} \sqrt{\lambda_1}e_{1,1} & \sqrt{\lambda_2}e_{1,2} & \sqrt{\lambda_3}e_{1,3} & \cdots & \sqrt{\lambda_p}e_{1,p} \\ \sqrt{\lambda_1}e_{2,1} & \sqrt{\lambda_2}e_{2,2} & \sqrt{\lambda_3}e_{2,3} & \cdots & \sqrt{\lambda_p}e_{2,p} \\ \sqrt{\lambda_1}e_{3,1} & \sqrt{\lambda_2}e_{3,2} & \sqrt{\lambda_3}e_{3,3} & \cdots & \sqrt{\lambda_p}e_{3,p} \\ \vdots & \vdots & \vdots & & \vdots \\ \sqrt{\lambda_1}e_{p,1} & \sqrt{\lambda_2}e_{p,2} & \sqrt{\lambda_3}e_{p,3} & \cdots & \sqrt{\lambda_p}e_{p,p} \end{bmatrix}$$

724 ↙  726 ↙

$$= \begin{bmatrix} sc_{1,1} & sc_{1,2} & sc_{1,3} & \cdots & sc_{1,p} \\ sc_{2,1} & sc_{2,2} & sc_{2,3} & \cdots & sc_{2,p} \\ sc_{3,1} & sc_{3,2} & sc_{3,3} & \cdots & sc_{3,p} \\ \vdots & \vdots & \vdots & & \vdots \\ sc_{n,1} & sc_{n,2} & sc_{n,3} & \cdots & sc_{n,p} \end{bmatrix} = Scores$$

METHODS AND SYSTEMS TO DETECT AND CORRECT OUTLIERS IN A DATASET STORED IN A DATA-STORAGE DEVICE

RELATED APPLICATIONS

Benefit is claimed under 35 U.S.C. 119(a)-(d) to Foreign Application Serial No. 201741027021 filed in India entitled "METHODS AND SYSTEMS TO DETECT AND CORRECT OUTLIERS IN A DATASET STORED IN A DATA-STORAGE DEVICE", on Jul. 29, 2017, by VMware, Inc., which is herein incorporated in its entirety by reference for all purposes.

TECHNICAL FIELD

The present disclosure is directed to methods and systems that automatically correct and remove or replace incorrect entries in a dataset of a database stored in a data-storage device.

BACKGROUND

A database is an organized collection of data, such as a collection of schemas, tables, queries, reports, views, and other objects. Databases can be classified according to content type, including bibliographic, full text, numerical, and images and according to how data is stored. Databases can be used to store various types of datasets, such as sales transactions, product catalogs, configuration and price listings, inventories, customer accounts, and customer profiles. Databases are typically managed with a database management server application ("DMSA") run on a database server computer. The database server computer is connected to multiple data-storage devices, such as RAID disk arrays, used for stable and reliable storage and access to the database. The DMSA provides database services, such as to creation, querying, updating, reading and writing to application programs and users.

Typical DMSAs do not identify and correct incorrect entries in the various datasets of a database. For example, certain datasets may be updated on a regular basis by one or more application agents that automatically collect information from a variety of different web sites and write the information to the datasets. Because the agents are automated computer programs, the agents are not able to identify errors in various web pages and may not be up-to-date with the most recent format changes to web pages of a web site. Because agents are not able to discern incorrect information displayed on a web page, agents routinely write incorrect information to datasets. As a result, database managers manually verify incorrect data. Manual verification of incorrect information in very large datasets becomes extremely expensive and time consuming. Database managers that use and rely on the accuracy of database information seek methods and systems to automatically detect and correct errors and incorrect information in the database.

SUMMARY

This disclosure presents automated methods stored in one or more data-storage devices and executed using one or more processors to detect and correct outliers in a dataset stored in a data-storage device. The dataset comprises parameter data that may be stored and organized in the form of a data table with rows and columns of parameter values. Each column comprises parameter values of the same type and each row comprise different types of parameter values. Each column of the parameter data is searched for outlier parameter values based on the parameters values in the same column. The parameter data may be searched for outlier rows of parameter values based on first and second largest variations in the parameter data. Substitute parameter values are determined for the outlier parameter values based on non-outlier parameter values of the parameter data. The substitute parameter values and corresponding outlier parameter values may be displayed in a database management user interface that enables a user to selectively accept or reject each of the substitute parameter values for the corresponding outlier parameter values.

DESCRIPTION OF THE DRAWINGS

FIGS. 7A-7G provide a step-by-step illustration of computational steps to determine any outlier rows of a dataset based in part on principle component analysis.

DETAILED DESCRIPTION

Figure 1:
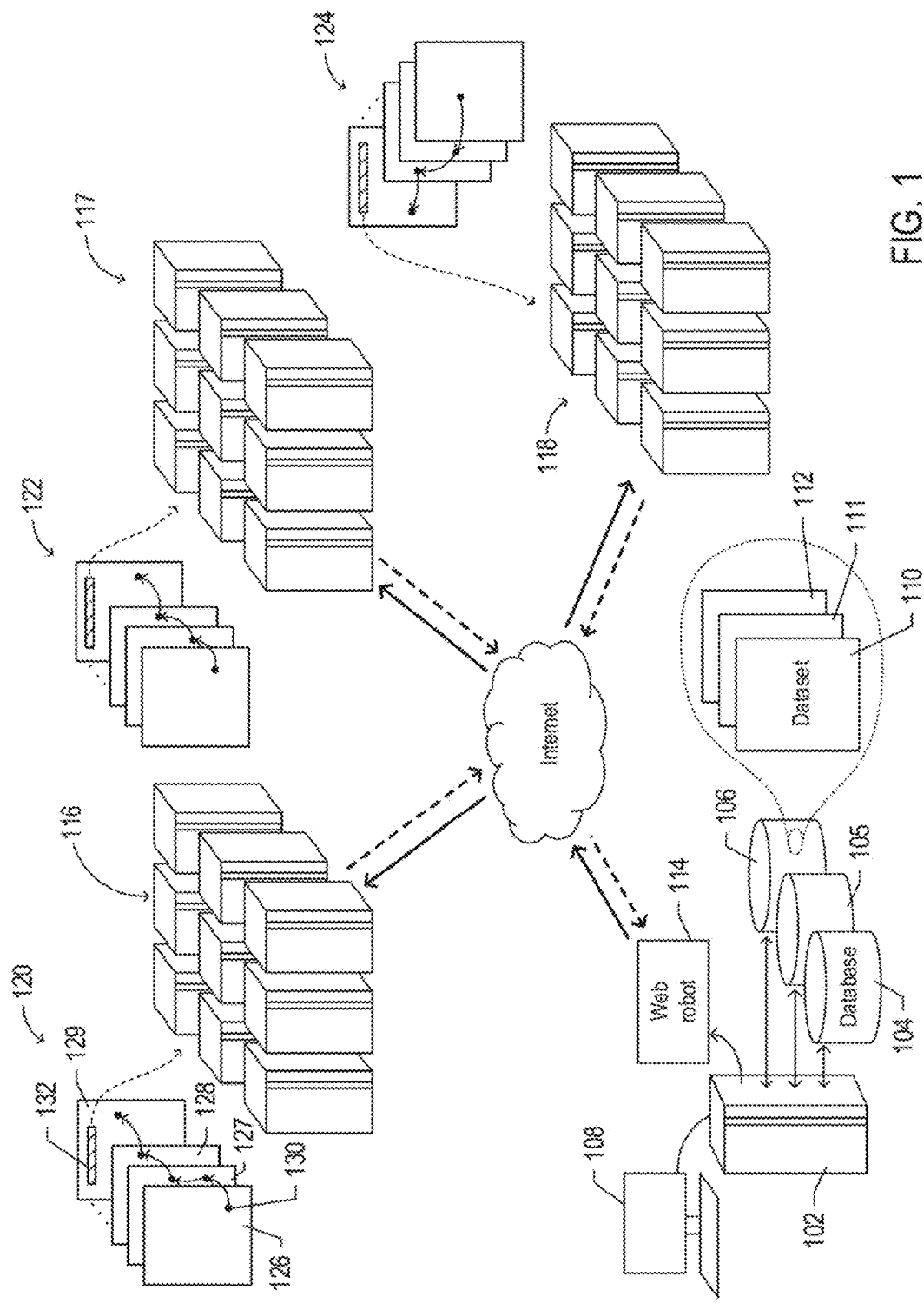
FIG. 1 shows an example of collecting information by a web robot from web sites and storing the information in a database managed by a database server computer.

FIG. 1 shows an example of collecting information from web sites and storing the information in a database managed by a database server computer. In FIG. 1, a database server computer 102 is connected to three data-storage devices 104-106 and a system console 108. The data-storage devices 104-106 can be disk arrays, such as RAID disk arrays to protect data against corruption and to serve the data to users. The server computer 102 and data-storage devices 104-106 may be used as network attached storage ("NAS") that provides a centralized location for data storage and data retrieval for authorized network users, application programs, and various clients. The database server computer 102 runs a database server application program that provides database services to other application programs, clients, and to a user via a database management graphical user interface ("GUI") displayed on the system console 108. The database server may be used to create, update, read data from, and write data to any of various databases stored on the data-storage devices. Each database comprises a collection of one or more datasets. For example, data-storage device 106 stores datasets 110-112 that together comprise a database.

Figures 2, 3:
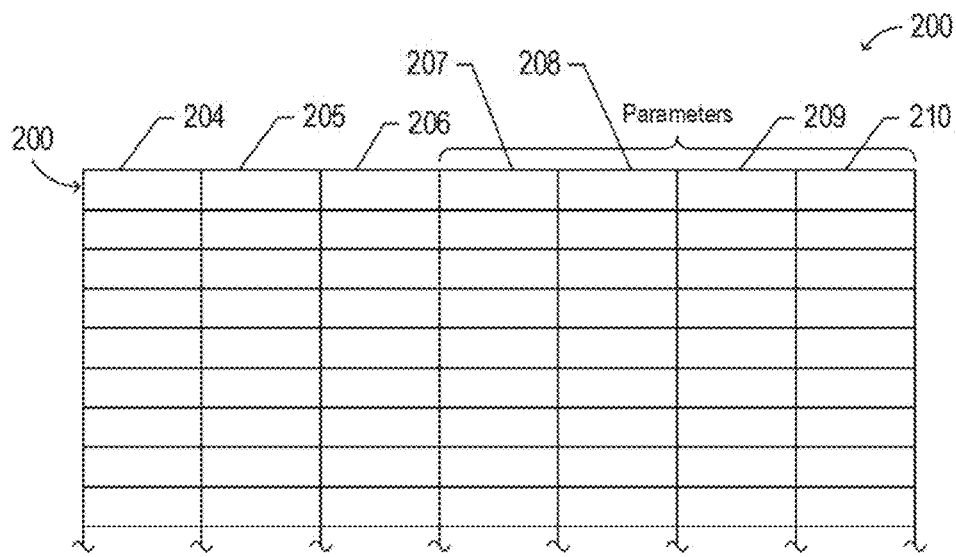
FIG. 2 shows an example table format of a dataset of database.
FIG. 3 shows an example of a dataset of server computers.

A dataset can be a data table that includes columns of parameter data. FIG. 2 shows an example table format of a dataset 200. Each row, such as row 202, represents an element of a collection of elements with a configuration and price. In the example of FIG. 2, columns 204-206 record text and/or text combined with numerical parameter descriptions that identify each element in the collection. For example, each row in the dataset may corresponds to information regarding various types of information technology ("IT") equipment with columns 202-204 listing the name of the IT equipment, model number, and serial number, respectively. The IT equipment may be server computers, network equipment, data-storage devices or any other physical resources of a datacenter or distributed computing system. Columns 207-210 are parameter data that represent the configuration and price of each piece of IT equipment. For example, columns 207-209 may each represent values of three different configuration parameters, such as number of processors, power consumption, network bandwidth, amount of memory, and amount of data storage. Column 210 records the price of each element charged by a vender.

FIG. 3 shows an example of a dataset 300 of server computers identified in columns 302-305. Column 302 list server model names, column 303 list server identification numbers, column 304 list number of racks, and column 305 list CPU model numbers. Columns 306-309 list specific types of numerical configuration parameters associated with each of the servers listed. Column 306 list number of CPUs, column 307 list amount of memory, column 308 list number of network interface cards, and column 309 list prices. For example, a server computer with server ID 123D3 is configurated with 1 CPU, 16 GB of RAM, 3 network interface cards, and has a list price of $5139. Columns 306-309 are the parameter data within the dataset 300 of server computers. Other types of datasets include network and storage equipment, such as routers, data-storage arrays, desktop computers, and workstations.

Each dataset of a database may be updated manually by a user using a database management GUI or by an application program that records data in a dataset as data is generated. Users may also attempt to manually search web sites for information and enter the information manually into a dataset. However, a web site may be of collection of thousands of web pages linked grouped together, such as through hyperlinks. Each web page is a document that can be displayed in web browser. As a result, manually searching web sites is extremely time consuming, error prone, and has a large associated labor cost. Alternatively, datasets may be created and updated by deploying application program agents, called "web robots," that autonomously and systematically browses web pages of web sites over the Internet for collecting particular types of information at a much higher rate than would be possible for a human alone. A web robot comprises automated script fetches, analyzes and files information from web sites at many times the speed of a human and at a much lower cost. When a web robot identifies a web page of interest, the web page may be copied, downloaded, and text of the web page may be processed to identify specific information content that is copied by the web robot to a dataset of a database.

Returning to FIG. 1, the database server computer 102 runs an application program agent 114 that systematically browses web pages of web sites for identifying particular types of information and copying the identified information to one of the datasets stored in the data-storage devices 110-112. FIG. 1 shows three datacenters 116-118 that each runs a different web site comprising multiple web pages. The web robot 114 may begin with a web address to a particular web site that provides access to the desired information listed on one or more of web pages. The web robot 114 may follow a series of web address until a desired web page is reached. For example, in FIG. 1, the web site maintained in the datacenter 116 comprises web pages 120. The web site maintained in the datacenter 117 comprises web pages 122. The web site maintained in the datacenter 118 comprises web pages 124. Each of the web sites 120, 122, and 124 contains information displayed on web pages the web robot 114 is configured to copy and record in a dataset stored one of the data-storage devices 104-106. The web robot 114 identifies the hyperlinks in each web page and adds the hyperlinks to a list of uniform resource locators ("URLs") to visit. The URLs from a list that is recursively visited by the web robot 114 according to a set of policies. When the web robot 114 is archiving information from a web site, the web robot 114 performs a text search of each web page to identify desired information and copies and saves the desired information in a dataset. For example, suppose the web robot 114 is configured to copy and record information on server computers from vendor web sites, such as the information in the dataset shown in FIG. 3. Suppose the web sites 120, 122, and 124 are web sites of different server computer venders. The web robot 114 may visit each of the web pages 126-129 of the web site 120. Dots, such as dot 130, represent hyperlinks to web pages in the web site. The web robot uses the hyperlinks to visit each web page. When the web robot 114 visits a web page, the text of the web page is searched to identify information regarding a server computer, such as server computer name, ID number and configuration parameters, such as number of CPUs and memory, and price, which are recorded in the dataset as shown in FIG. 3. For example, shaded rectangle 132 in web page 129 represents text, configuration parameters, and price of a server computer that is copied by the web robot 114 and stored in a dataset of the data-storage devices 104-106.

Web robots often record incorrect information for primarily two reasons. 1) Because web robots are automated computer script programs, web robots employ text searching that is not able to discern incorrect information recorded in the web pages of a web site. 2) Web robots may not be up-to-date with the most recent format changes to web pages of a web site maintained by a vendor. As a result, web robots routinely incorrectly parse the text of recently changed web pages and record incorrect information in datasets. For example, FIG. 3 includes incorrect recorded entries 310 and 312. Entry 310 records an incorrect memory value of 348 GB. Entry 312 records an incorrect price of $31,328, which is way out of line with typical prices of server computers. Such errors in a large dataset comprising thousands or potentially millions of data entries can create costly errors when the incorrect data is relied on. Datacenters that provide computing and data storage as a service ("IT services") for various enterprises rely heavily on accurate information recorded in the reference libraries (i.e., datasets) of physical resources, such as servicer computers, network equipment, and data-storage storage devices. The reference libraries are used as input to automated IT management software that provide transparency and analysis of the cost and expenses of IT services. Incorrect information recorded in a reference library can have serious cost implications for datacenter managers that rely on this information to calculate actual and projected costs for IT servers. For example, automated IT management software references configuration and costs of IT equipment maintained in separate reference libraries to calculate actual and projected costs of deploying application programs in virtual machines of a datacenter. If the entries in one or more of the datasets are incorrect, as illustrated in FIG. 3, then the actual or projected costs of the virtual machines presented to an enterprise are in error, which may result in an under or over change for IT services or an over estimate of projected costs, which may cause an enterprise to seek out another datacenter for IT services.

As described above with reference to FIGS. 2 and 3, each column of parameter data corresponds to the same type of information, such number of CPUs, amount of memory, amount of storage, network bandwidth, power usage, or price. Methods are implemented with two approaches to identify and correct incorrect entries in the parameter data portion of a dataset. An incorrect entry in the parameter matrix portion of a dataset is called an "outlier." Entries 310 and 312 in FIG. 3 are examples of a configuration parameter outlier and a price outlier, respectively. A first approach described below with reference to FIGS. 4 and 5 detects outlier entries in each column of the parameter data. When outliers are detected, the outliers are reported to a user, for example via a database management GUI described above. Outliers may also be corrected. If a corrected outlier is not correctable or acceptable to a user, the row associated with the outlier may be deleted, which reduces storage space devoted to the dataset. A second approach described below with reference to FIGS. 7-9 detects rows of outliers in the parameter data.

Figure 4:
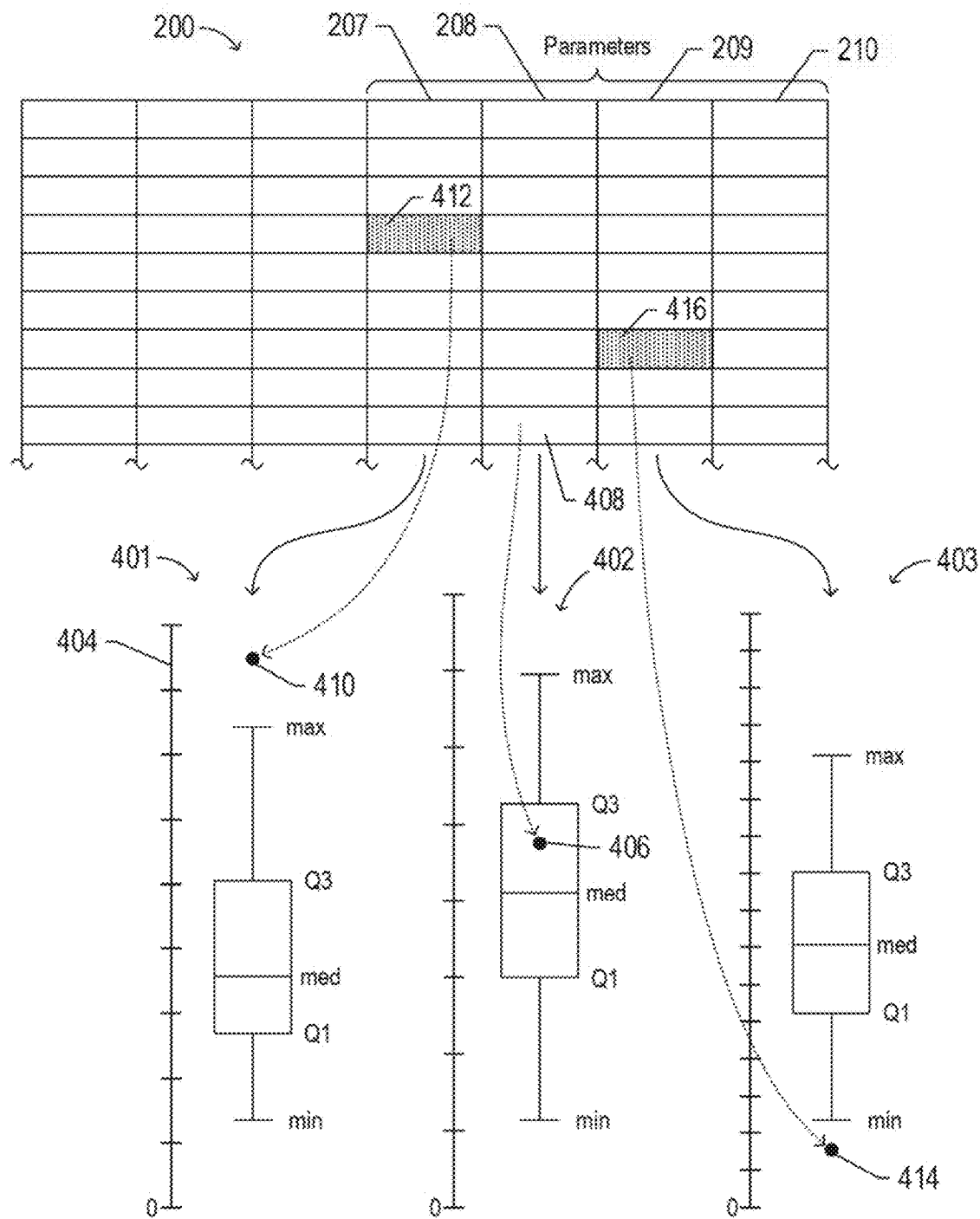
FIG. 4 shows an example of outliers detected in columns of the parameter data of a dataset.

FIG. 4 shows an example of detecting outliers in columns of the parameter data of the dataset 200 based on minimum and maximum parameter value limits. FIG. 4 shows a separate box plot for columns 207-209 of the parameter data. The box plots 401-403 may be constructed from previously determined distributions of configuration parameters. Each box plot includes a scale that represents a range of values for a configuration parameter. For example, box plot 401 includes a scale 404 that represents a range of values starting with zero for the values of the parameters in the column 207. Each box plot includes a maximum and a minimum, a median, and a likely range of variation, called the "interquartile range," between a first quartile denoted by Q1 and third quartile denoted by Q3. The median is the second quartile. The parameter values in column 207 may be distributed with 25% of the parameter values between the minimum and the first quartile Q1, 50% of the parameter values in the interquartile range between the quartiles Q1 and Q3, and 25% of the parameter values between the quartile Q3 and the maximum. Any parameter value in a column of configuration parameters that is not within the minimum and maximum of a box plot of the configuration parameter values is identified as an outlier. For example, dot 406 represents the parameter value of entry 408 in column 208 of configuration parameters. The parameter value 406 is within the interquartile range and is not be identified as an outlier. On other hand, dot 410 is the parameter value of entry 412 in column 207 of configuration parameters. The parameter value 410 is greater than the maximum and is identified as an outlier. Dot 414 is the parameter value of entry 416 in column 209 of configuration parameters. The parameter value 414 is less than the minimum and is also identified as an outlier.

In an alternative implementation, k-means clustering may be used to determine k clusters of parameter values in a column of parameter values, where k is a positive integer. An outlier is a parameter value that lies outside the k clusters. K quantiles, denoted by $\{q_j\}_{j=1}^{k}$, may be used as seed centroids of k clusters of the parameter values. The values of the k quantiles are iteratively adjusted to obtain k centroids of the k clusters. Each parameter value $x_p$ in a column of parameter values is assigned to one of the k clusters defined by:

$$C_i^{(m)} = \{x_p : |x_p - q_i^{(m)}| \leq |x_p - q_j^{(m)}| \forall j, 1 \leq j \leq k\} \quad (1)$$

where $C_i^{(m)}$ is the i-th cluster i=1, 2, . . . , k; and m is an iteration index m=1, 2, 3, . . . .

The value of the quantile $q_i^{(m)}$ is assigned to the mean value of the i-th cluster of parameter values, which is computed according to Equation (2) as follows:

$$q_i^{(m+1)} = \frac{1}{|C_i^{(m)}|} \sum_{x_p \in C_i^{(m)}} x_p \quad (2)$$

where $|C_i^{(m)}|$ is the number of data points in the i-th cluster.

For each value of m, Equation (1) is used to assign parameter values to the i-th cluster of parameter values followed by computing the centroid of each cluster according to Equation (2). The computational operations represented by Equations (1) and (2) are repeated for each value of m until the data points assigned to the k clusters do not change. In an alternative implementation, k-means++ clustering may be used to select seed centroids for the k clusters.

The parameter values assigned to each cluster may be normally distributed about the centroid of the corresponding cluster. Consider a set of centroids $Q=\{q_1^c, q_2^c, \ldots, q_k^c\}$ iteratively determined using Equations (1) and (2). Suppose $x_{p)}$ is a parameter value that belongs to the j-th cluster $C_j$ with centroid $q_j^c$. For j=1, 2, . . . , k, a normalcy interval may be computed for the j-th cluster $C_j$ as follows:

$$Q_j = [q_j^c - B^* std(x_p^{(j)} - q_j^c) \cdot q_j^c + B^* std(x_p^{(j)} - q_j^c)] \quad (3)$$

where std(·) is the standard deviation; and

B represents a number of standard deviations from the centroid $q_j^c$ of the j-th cluster $C_j$.

Figure 5:
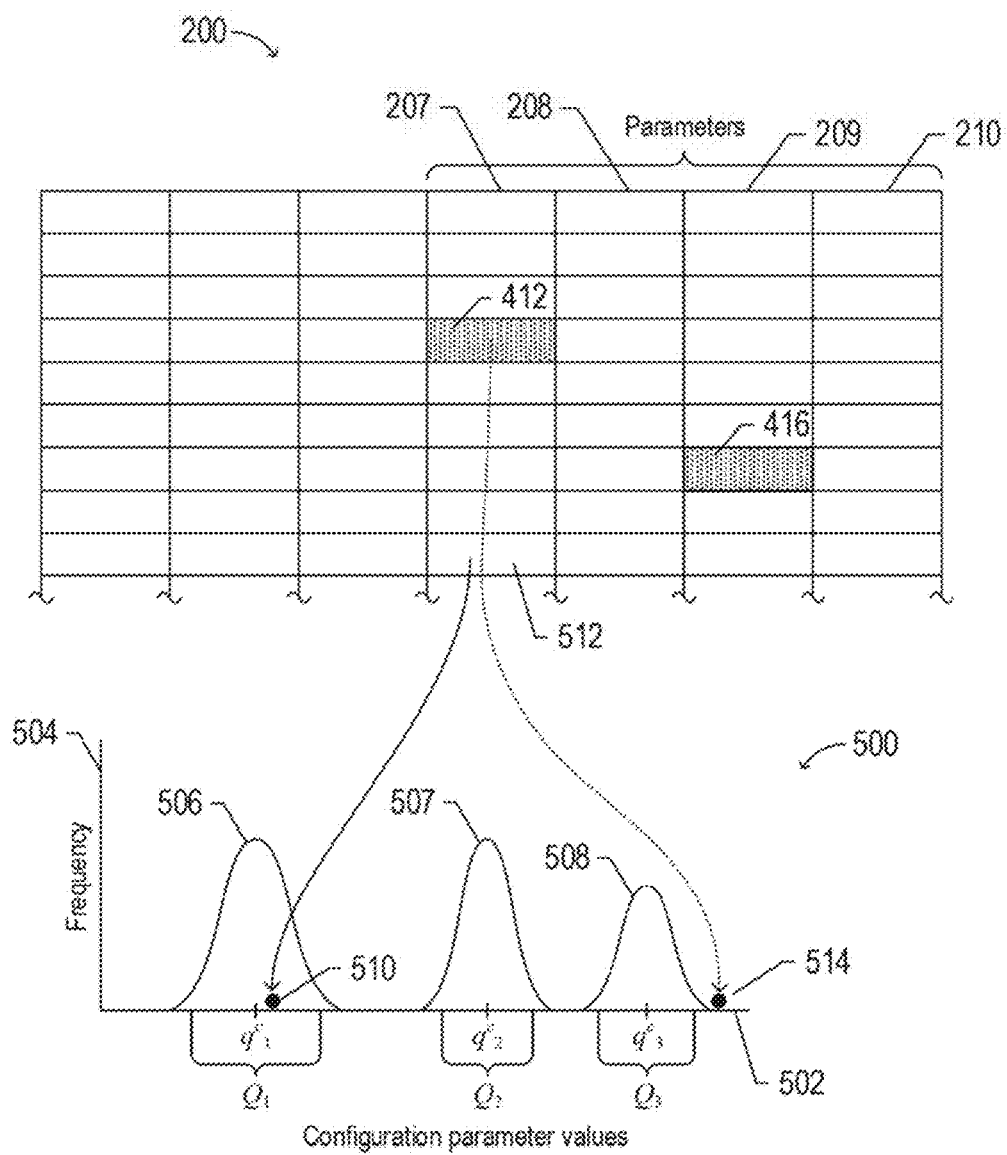
FIG. 5 shows an example of outliers detected in columns of the parameter data of a dataset.

FIG. 5 shows an example plot 500 of parameter values of the column 207 of configuration parameter values of the dataset 200. Horizontal axis 502 represents a range parameter values. Vertical axis 504 represents frequencies for the parameter values. In this example, three different clusters have been identified with centroids given by $q_1^c, q_2^c$, and $q_3^c$ and corresponding distributions 506-508. Each cluster has an associated normalcy interval $Q_1, Q_2$ and $Q_3$ determined according to Equation (3) for a selected number of standard deviations B (e.g., B=2 or B=3). Each of the parameter values in column 207 belongs to one of the normalcy intervals. For example, dot 510 is the parameter value in entry 512 of column 207. Dot 514 is the parameter value in shaded entry 412, which does not belong to any of the normalcy intervals and is identified as an outlier.

When an outlier in a column of parameter values is detected, as described above with reference to either FIG. 4 or 5, the row containing the outlier parameter value is determined. Values of configuration parameters in other column entries of the row containing the outlier are compared with values of corresponding configuration parameters of other rows. When a row is identified as having values of configuration parameters other than the outlier that match the values of the configuration parameters of the row with the outlier, the outlier may be replaced by the parameter value in the same column of the identified row.

Figure 6A:
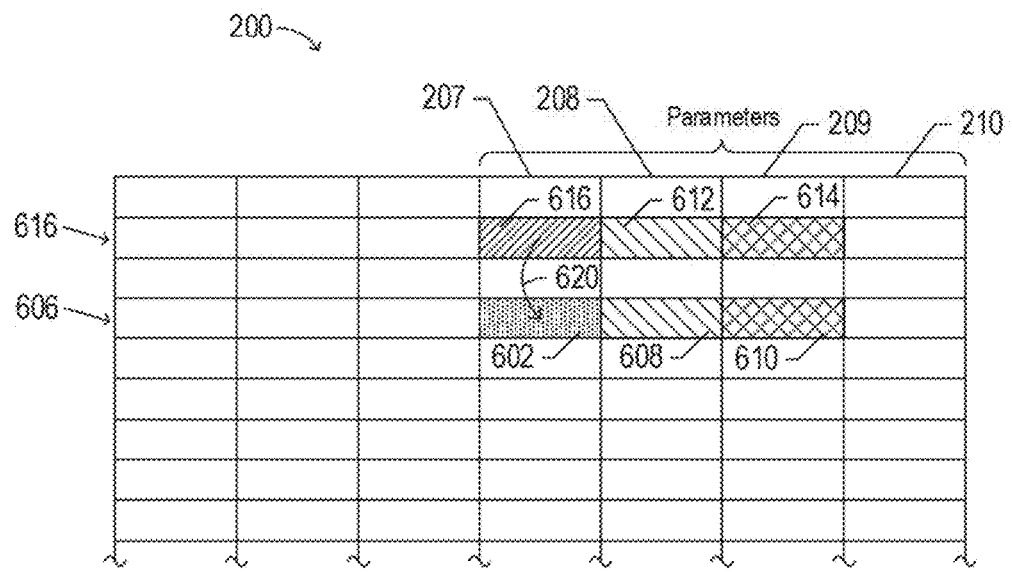
FIGS. 6A-6B show examples of imputing outlier parameter values of parameter data with substitute parameter values of similarly configured information technology equipment.
Figure 6B:
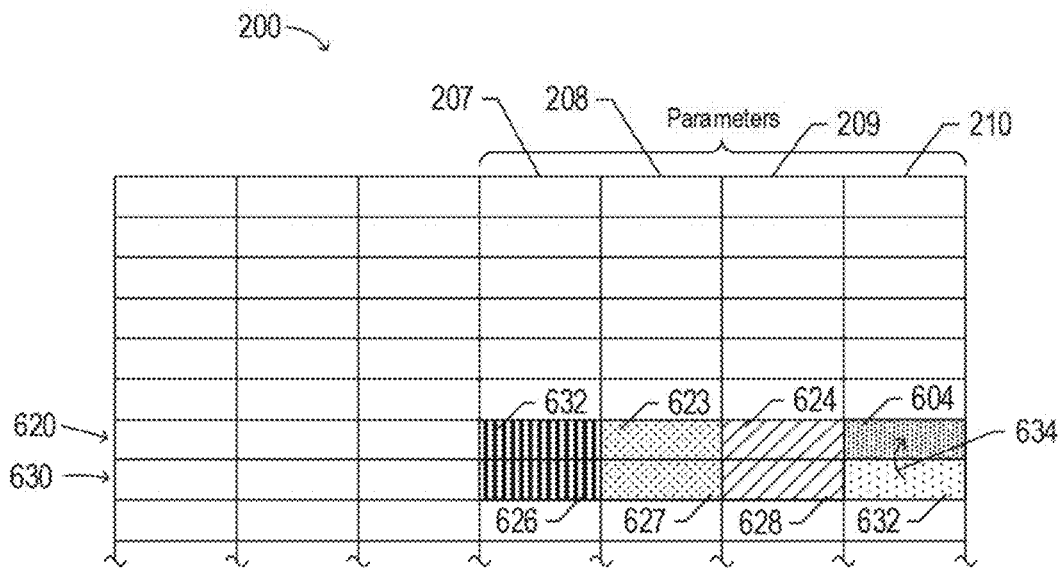

FIGS. 6A-6B show the dataset 200 with detected outliers represented by shaded entries 602 and 604, respectively. In FIG. 6A, the outlier in entry 602 is a configuration parameter that belongs to a row 606 with other configuration parameters in columns 208 and 209. Hash-marked entry 608 and cross-hatched entry 610 represent values of configuration parameters for the row 606 in columns 208 and 209. For each row of the dataset 200, values of configuration parameters in columns 208 and 209 are compared with the values in entries 608 and 610. Hash-marked entry 612 and cross-hatched entry 614 of row 616 represent values of configuration parameters in columns 208 and 209 that match the values of configuration parameters in entries 608 and 610, respectively. The value in entry 618 may be used to replace the outlier value in entry 602 as indicated by directional arrow 620. In FIG. 6B, the outlier in entry 604 is a price that belongs to a row 620 with other configuration parameters in columns 207-209. Patterned entries 622-624 represent values of configuration parameters for the row 620 in columns 207-209. For each row of the dataset 200, values of configuration parameters in columns 207-209 are compared with the values in entries 622-624. Patterned entries 626-628 of row 630 represent values of configuration parameters in columns 207-209 that match the values of configuration parameters in entries 622-624, respectively. The price in entry 632 may be used to replace the outlier price in entry 604 as indicated by directional arrow 634.

A user may be provided with a display of a dataset with incorrect entries identified and a substitute parameter value. The user may be provided with the option to accept or reject the substitute parameter value in a database management GUI, as described below with reference to FIGS. 11A-11B. When no row can be identified as having values of configuration parameters that match the values of the configuration parameters of the row with the outlier, the user may delete the row with the outlier from the database.

The second approach detects one or more rows with outlier parameters. This approach considers the full set of parameter data of the dataset. FIGS. 7A-7G provide a step-by-step illustration of computational steps to determine any outlier rows of a dataset based in part on principle component analysis.

Figure 7A:
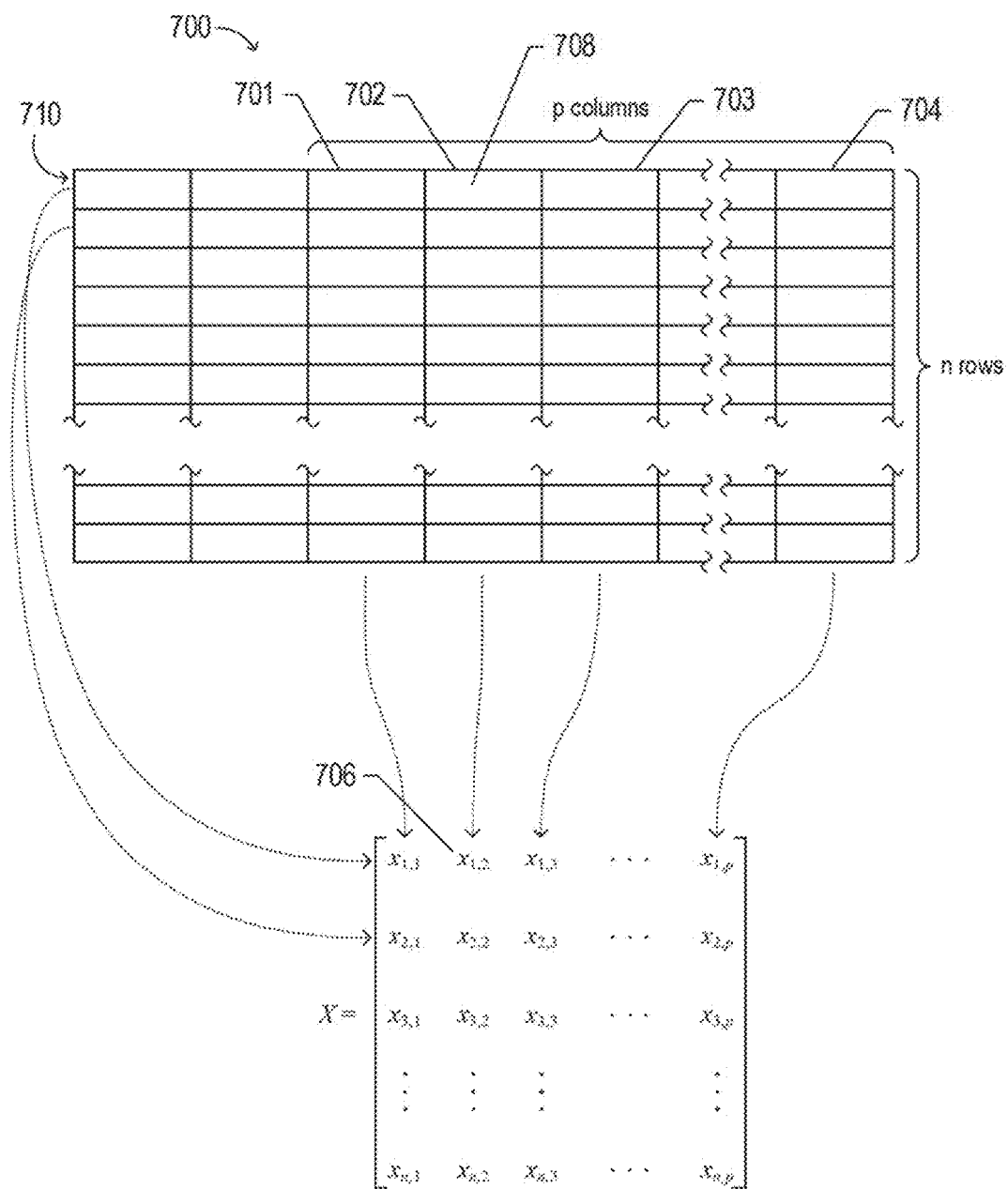

FIG. 7A shows a dataset 700 with n rows and p columns of parameter data, where n and p are positive integers. Columns 701-703 represent the first, second, and third columns of parameter data, and column 704 represents the p-th column of parameter data. Rows may represent a listing of the same type of IT equipment with a particular configuration of components and price as described above with reference to server computers of FIG. 3. For example, the n rows may be a listing of n server computers, n routers, or n data-storage devices. The columns 1 through p−1, including columns 701-703, may represent configuration parameters for the IT equipment. The p-th column 704 may represent the price of each piece of IT equipment listed in the dataset 700. FIG. 7A includes an n-by-p parameter matrix X that represents the parameter values in the n rows and p columns of the parameter data in the dataset 700. Columns 701, 702, 703, and 704 correspond to columns in the parameter matrix X and rows of parameter values correspond to rows in the parameter matrix X. Matrix elements of the parameter matrix X are denoted by $x_{i,j}$, where subscripts i and j are row and column indices, respectively. For example, matrix element $x_{1,2}$ 706 represents the parameter value of entry 708 in the first row 710 of the second parameter data column 702.

A mean value is computed for each column of parameter values of the parameter matrix X as follows:

$$\mu_j = \frac{1}{n} \sum_{i=1}^{n} x_{i,j} \qquad (4)$$

FIG. 7B shows mean values computed for each column of the parameter matrix X denoted by $\mu_j$, where j=1, . . . p. For example, if the j-th column comprises a list of RAM memory for each piece of IT equipment listed in the dataset 700, then $\mu_j$ is mean of the RAM memory of the IT equipment. The mean value computed for each column of the parameter matrix X is subtracted from the matrix elements in the associated column, as shown in FIG. 7C, in order to center the parameter data at the origin of p-dimensional coordinate system. FIG. 7C shows computation of a centered parameter matrix Y from the parameter matrix X. By centering the parameter matrix X to obtain the centered parameter matrix Y, the mean value of each column of the centered parameter matrix Y is zero.

A covariance matrix of the centered parameter matrix Y is computed as follows:

$$\Sigma(Y) = \frac{1}{n-1} Y^T Y \qquad (5)$$

where superscript "T" represents the transpose matrix operation applied to the centered parameter matrix Y.

The covariance matrix $\Sigma(Y)$ provides both the variance (i.e., spread) and the orientation (covariance) of variance of parameter data in the centered parameter matrix Y. Eigen-decomposition of the covariance matrix $\Sigma(Y)$ can be used to determine two principle vectors that point in the directions of the largest and second largest variances (i.e., spreads) in the parameter data of the centered parameter matrix Y.

FIG. 7D shows eigen-decomposition of the covariance matrix $\Sigma(Y)$. The eigenvalues are diagonal elements of a diagonal matrix 712 and are denoted by $\lambda^j$, where j=1, . . . , p is the eigenvalue index. Each eigenvalue $\lambda^j$ corresponds to an eigenvector denoted by $E^j$. Eigenvectors $E^j$ are represented as column vectors in an eigenvector matrix 714 that appears on both sides of the eigen-decomposition equation for the variance matrix $\Sigma(Y)$ illustrated in FIG. 7D:

$$E^j = \begin{bmatrix} e_{1,j} \\ e_{2,j} \\ \vdots \\ e_{p,j} \end{bmatrix} \qquad (6)$$

where $e_{i,j}$ represents the j-th component of the j-th eigenvector $E^j$.

The eigenvectors of the covariance matrix $\Sigma(Y)$ are orthogonal. Each eigenvector corresponds a direction of variance (i.e., spread) of parameter data of the centered parameter matrix Y in the p-dimensional coordinate system. Each eigenvalue is the magnitude of the variation of parameter data of the centered parameter matrix Y in the direction of the associated eigenvector. For example, the eigenvector $E^j$ corresponds to a direction in which the parameter data of the centered parameter matrix Y vary in the p-dimensional coordinate system. The corresponding eigenvalue $\lambda^j$ represents the magnitude of this variance (i.e., spread) of the parameter data in the direction of eigenvector $E^j$. The eigenvector with the largest corresponding eigenvalue indicates the direction of the greatest variance (i.e., spread) in the parameter data of the centered parameter matrix Y. The eigenvector with the smallest corresponding eigenvalue indicates the direction of the smallest variance (i.e., spread) in the parameter data of the centered parameter matrix Y.

The eigenvalues of the covariance matrix $\Sigma(Y)$ are ordered from largest to smallest. Ordered eigenvalues are denoted by $\lambda_j$, where $j=1, \ldots, p$ and the subscript designates the order of the eigenvalues. For example, $\lambda_1$ is the largest of the eigenvalues of the variance matrix $\Sigma(Y)$, $\lambda_2$ is the second largest of the eigenvalues of the variance matrix $\Sigma(Y)$, and $\lambda_p$ is the smallest of the eigenvalues of the variance matrix $\Sigma(Y)$. The ordered eigenvalues are used to order the corresponding eigenvectors in an order eigenvector matrix, as shown in FIG. 7E. In FIG. 7E, the eigenvectors of the eigenvector matrix 714 are ordered so that the first column of the ordered eigenvector matrix 716 comprises the eigenvector $E_1$ that corresponds the largest eigenvalue $\lambda_1$, the second column of the ordered eigenvector matrix 716 comprises the eigenvector $E_2$ that corresponds to the second largest eigenvalue $\lambda_2$, and the p-th column of the ordered eigenvector matrix 716 comprises the eigenvector $E_p$ that corresponds to the smallest eigenvalue $\lambda_p$.

FIG. 7F shows a loading matrix denoted by LD computed from the ordered eigenvector matrix 716 and corresponding ordered eigenvalues. As shown in FIG. 7F, each column of the loading matrix 718 is computed by multiplying each column of the ordered eigenvector matrix 716 by the square root of the corresponding eigenvalue. In other words, each column of the loading matrix is $\sqrt{\lambda_j}E_j$, for $j=1, \ldots, p$. Column 720 is the eigenvector with the largest corresponding eigenvalue and corresponds to the direction of the largest variance (i.e., spread) in the parameter data of the centered parameter matrix Y. Column 722 is the eigenvector with the second largest corresponding eigenvalue and corresponds to the direction of the second largest variance (i.e., spread) in the parameter data of the centered parameter matrix Y.

FIG. 7G shows the centered parameter matrix Y multiplied by the loading matrix ID to obtain a Scores matrix. The elements in a first column 724 of the Scores matrix are scores computed by multiplying each row in the centered parameter matrix Y by the first column 720 of the loading matrix and are referred to as the first principle components ("PC1"). The elements in a second column 726 of the Scores matrix are scores computed by multiplying each row of the centered parameter matrix Y by the second column 722 of the loading matrix and are referred to as the second principle components ("PC2").

The first and second loaded eigenvectors $\sqrt{\lambda_1}E_1$ and $\sqrt{\lambda_2}E_2$ are orthogonal and form corresponding first and second principle component axes of a two-dimensional principle component space. The first principle components 724 are projected onto the first principle component axis. The second principle components 726 are projected onto the second principle component axis. Pairs of scores $(sc_{i,1}, sc_{i,2})$ are scattered bivariate points in the principle component space.

Figure 8:
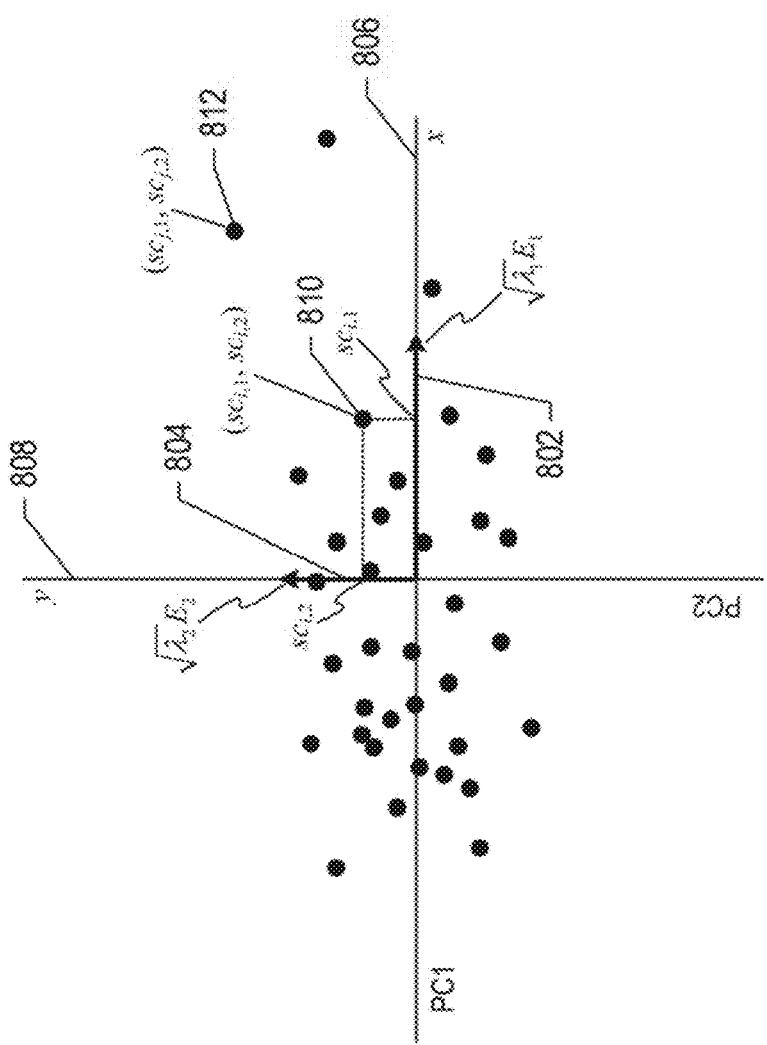
FIG. 8 shows an example scatter plot of bivariate scores in a principle component space.

FIG. 8 shows an example scatter plot of scores in a principle component space. Directional arrow 802 represents loaded eigenvector $\sqrt{\lambda_1}E_1$. Directional arrow 804 represents loaded eigenvector $\sqrt{\lambda_2}E_2$. Horizontal axis 806 is a first principle axis that corresponds to the loaded eigenvector $\sqrt{\lambda_1}E_1$. Vertical axis 808 is a second principle axis that corresponds to the loaded eigenvector $\sqrt{\lambda_2}E_2$. Dot 810 represents a bivariate point $(sc_{i,1}, sc_{i,2})$ that correspond to the i-th row in the parameter matrix X. Dot 812 represents a bivariate point $(sc_{j,1}, sc_{j,2})$ that correspond to the j-th row in the parameter matrix X. As shown in example of FIG. 8, the scattered bivariate points have a greater variance or spread in the direction of loaded eigenvector $\sqrt{\lambda_1}E_1$ than in the direction of loaded eigenvector $\sqrt{\lambda_2}E_2$.

The scattered bivariate points are assumed to be normally distributed along the first and second principle component axes. The variance of the scores along the first principle component axis 806 is computed as follows:

$$\sigma^2_{PC1} = \frac{1}{p}\sum_{i=1}^{p}(sc_{i,1} - \mu_{PC1})^2 \tag{7a}$$

where $$\mu_{PC1} = \frac{1}{p}\sum_{i=1}^{p} sc_{i,1}$$

The variance of the scores along the second principle component axis 808 is computed as follows:

$$\sigma^2_{PC2} = \frac{1}{p}\sum_{i=1}^{p}(sc_{i,2} - \mu_{PC2})^2 \tag{7b}$$

where $$\mu_{PC2} = \frac{1}{p}\sum_{i=1}^{p} sc_{i,2}$$

A tolerance ellipse is computed from the variances in Equations (7a) and (7b) as follows:

$$\frac{sc^2_{i,1}}{\sigma^2_{PC1}} + \frac{sc^2_{i,2}}{\sigma^2_{PC2}} = \sqrt{\chi^2_{p,tol}} \tag{8}$$

where
- $\sigma_{PC1}^2$ is the major axis of the tolerance ellipse and corresponds to the largest variance in the bivariate points;
- $\sigma_{PC2}^2$ is the minor axis of the tolerance ellipse and corresponds to the second largest variance in the bivariate points; and
- $\sqrt{\chi^2_{p,tol}}$ is the chi-square root of a tolerance denoted by "tol."

Figure 9:
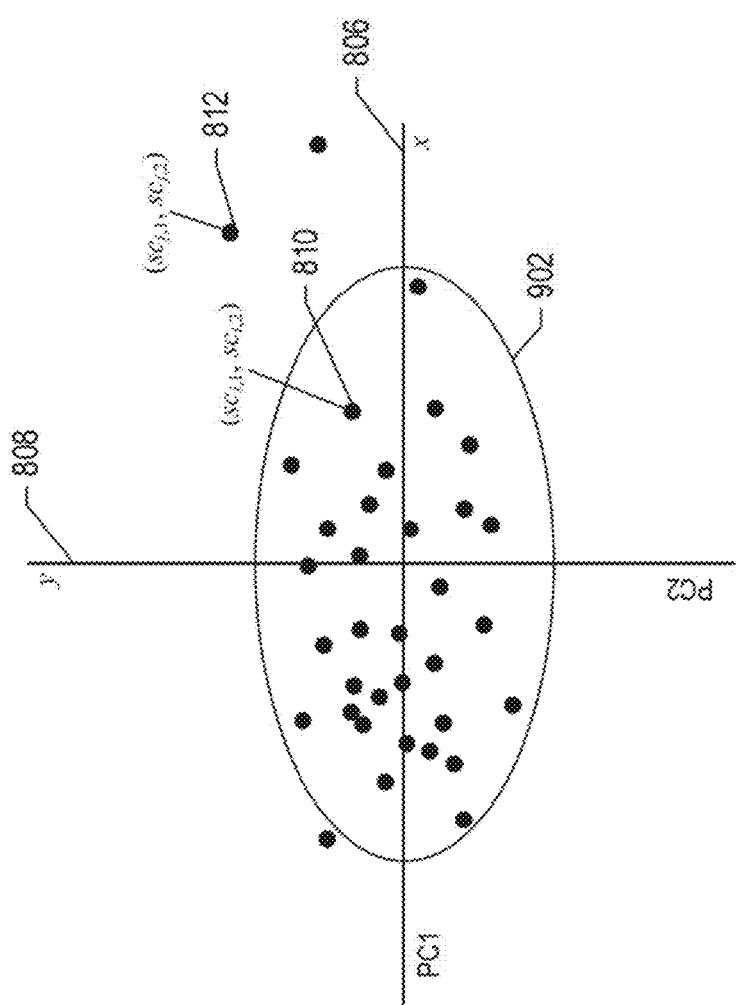
FIG. 9 shows an example of a tolerance ellipse added to the scatter plot of bivariate scores shown in FIG. 8.

For example, the tolerance, tol, is the percentage of bivariate points within the tolerance ellipse. Examples of tolerances include 90%, 95%, or 97.5%. FIG. 9 shows an example tolerance ellipse 902 in the plot of bivariate points shown in FIG. 8. A bivariate point ($sc_{j,1}$,$sc_{j,2}$) 812 located outside the tolerance ellipse 902 is identified as an outlier and the corresponding j-th row of the parameter matrix X is identified as an outlier row of parameter values. In other words, when a bivariate point ($sc_{j,1}$,$sc_{j,2}$) satisfies the following condition:

$$\frac{sc_{j,1}^2}{\sigma_{PC1}^2} + \frac{sc_{j,2}^2}{\sigma_{PC2}^2} > \sqrt{\chi_{p,tol}^2} \tag{9a}$$

the corresponding j-th row of the parameter matrix X is an outlier row of parameter values. On the other hand, the i-th row of the parameter matrix X that corresponds to a bivariate point ($sc_{i,1}$,$sc_{i,2}$)) that satisfies the condition:

$$\frac{sc_{i,1}^2}{\sigma_{PC1}^2} + \frac{sc_{i,2}^2}{\sigma_{PC2}^2} \le \sqrt{\chi_{p,tol}^2} \tag{9b}$$

is not identified as an outlier row.

Parameter values of the non-outlier rows of the parameter matrix X are used to compute a generalized linear model given by:

$$G = \beta_0 + \beta_1 x_1 + \beta_2 x_2 + \ldots + \beta_p x_p \tag{10}$$

where $\beta_0$, $\beta_1$, $\beta_2$, ..., $\beta_p$ are coefficients; and

G is a constant in terms of given values $x_1$, $x_2$, ..., and $x_p$.

The coefficients $\beta_0$, $\beta_1$, $\beta_2$, ..., and $\beta_p$ are computed by applying generalized linear regression using the parameter values of the non-outlier rows of the parameter matrix X. The generalized linear model is used to impute outliers with a predicted parameter value from the generalized linear model in Equation (10).

Figure 10:
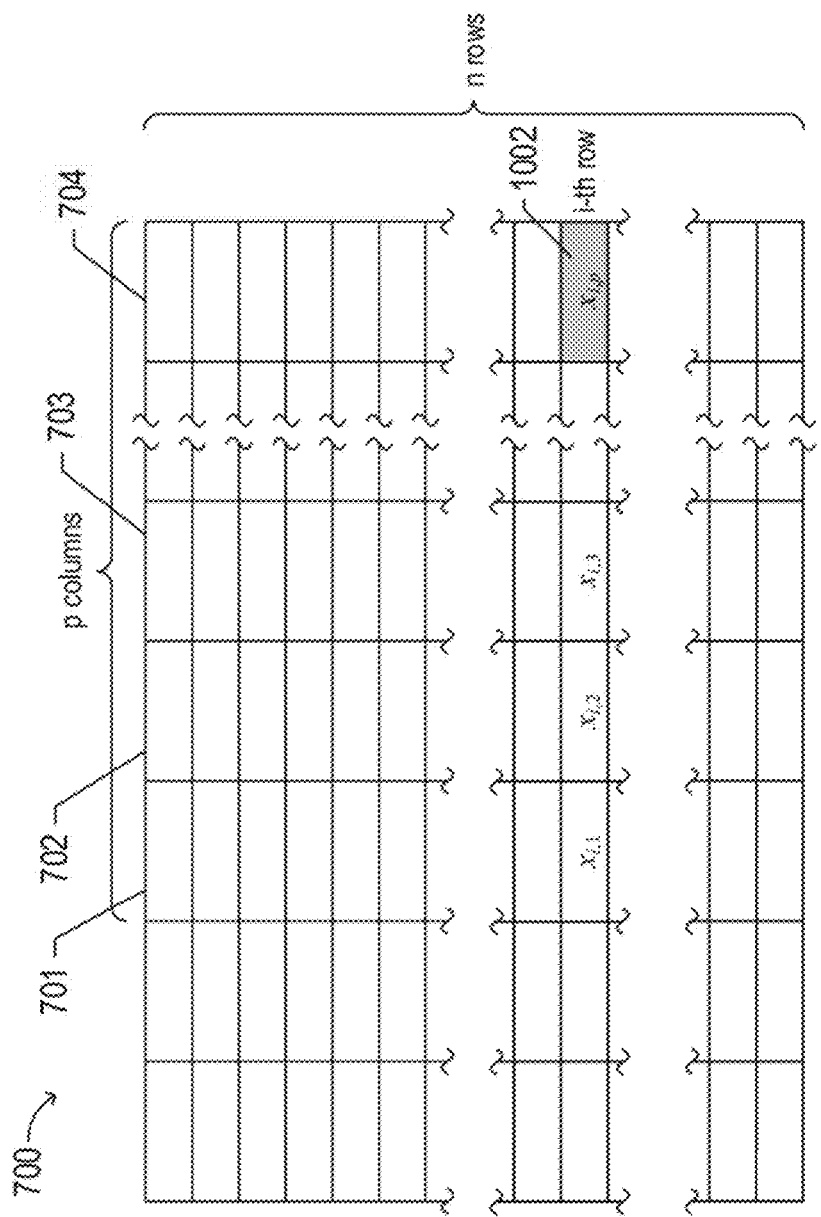
FIG. 10 shows an example of a dataset with an outlier.

FIG. 10 shows the dataset 700 described above with reference to FIG. 7A. Suppose the parameter value $x_{i,p}$ in shaded entry 1002 of the i-th row of the parameter data is an outlier. The parameter value $x_{i,p}$ may have been identified as an outlier as described above with reference to FIGS. 4 and 5. The outlier parameter value $x_{i,p}$ may be imputed with a predicted parameter value using the generalized linear model Equation (10). Substituting the parameter values of the i-th row into Equation (10), excluding the outlier parameter value $x_{i,p}$, the predicted parameter value is computed as follows:

$$x'_{i,p} = \frac{G - (\beta_0 + \beta_1 x_1 + \beta_2 x_2 + \ldots + \beta_{p-1} x_{p-1})}{\beta_p}$$

The outlier parameter value $x_{i,p}$ in dataset 700 is imputed with the predicted parameter value $x'_{i,p}$.

Following imputation of outliers with predicted values, the dataset is displayed in a database management GUI on the system console 108 for manual verification by a user. The database management GUI enables a user to view both the identified outlier parameter value and the predicted parameter value. The user has the option of deleting the row, rejecting the substitution of the predicted parameter value for the outlier parameter value, or accepting replacement of the outlier parameter value with the predicted parameter value.

Figure 11:
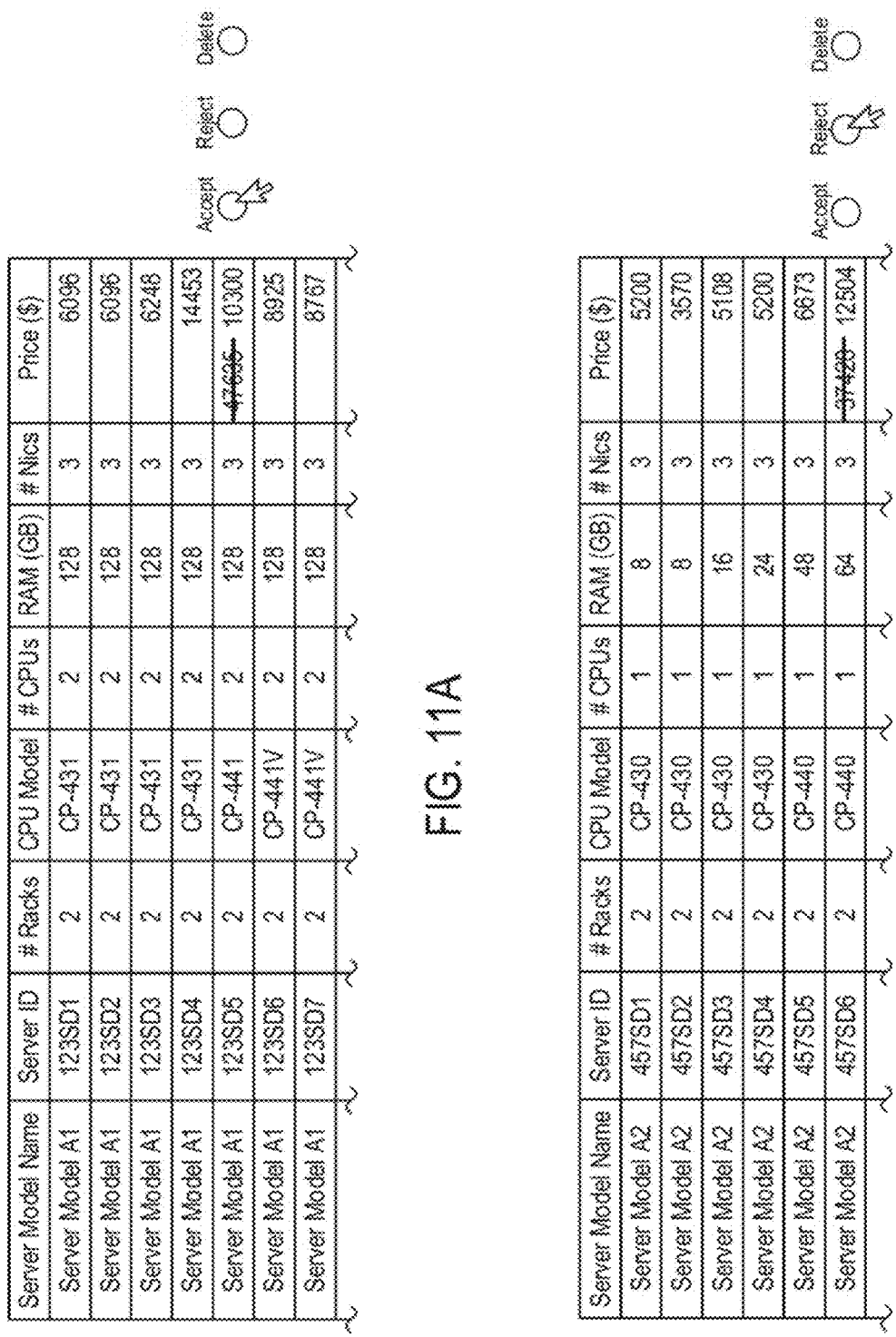
FIGS. 11A-11B show examples of server computer datasets in separate database management graphical user interfaces.

FIGS. 1A-11B show examples of server computer datasets in separate database management GUIs. In both dataset, outlier prices have been detected as described above and corrected by displaying a line drawn through the outlier price and a predicted price next to the outlier. In these examples, a user may click on accept, as shown in FIG. 11A, in which case the outlier price is deleted from the dataset and the predicted price is recorded. Alternatively, a user may click on delete, as shown in FIG. 11B, in which case the entire row is deleted from the dataset.

Figure 12:
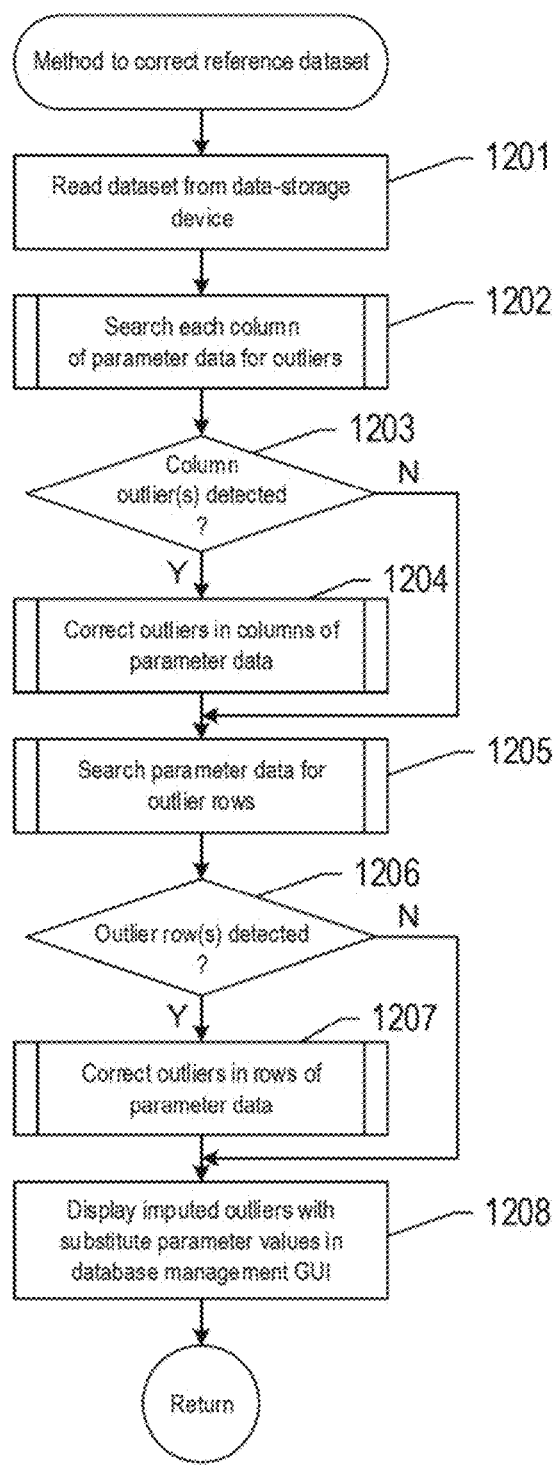
FIG. 12 shows a control-flow diagram of a method to correct a reference dataset.

FIG. 12 shows a control-flow diagram of a method to correct a reference dataset. In block 1201, a dataset is read from a data-storage device. The dataset may be routinely undated by a web robot that searches for and records information from various web sites, as described above with reference to FIG. 1. In block 1202, a routine "search each column of parameter data for outliers" is called. In decision block 1203, when outliers have been detected in columns, control flows to block 1204. Otherwise, control flows to block 1205. In block 1204, a routine "correct outliers in columns of parameter data" is called. In block 1205, a routine "search parameter data for outlier rows" is called. In decision block 1206, when outlier rows have been detected, control flows to block 1207. Otherwise, control flows to block 1208. In block 1207, a routine "correct outliers in rows of parameter data" is called. In block 1208, imputed outliers with substitute parameter values are displayed in a database management GUI of dataset. The database management GUI enables a user to accept or reject each substitute parameter value or delete an entire row parameter values as described above with reference to FIGS. 11A-11B.

Figure 13:
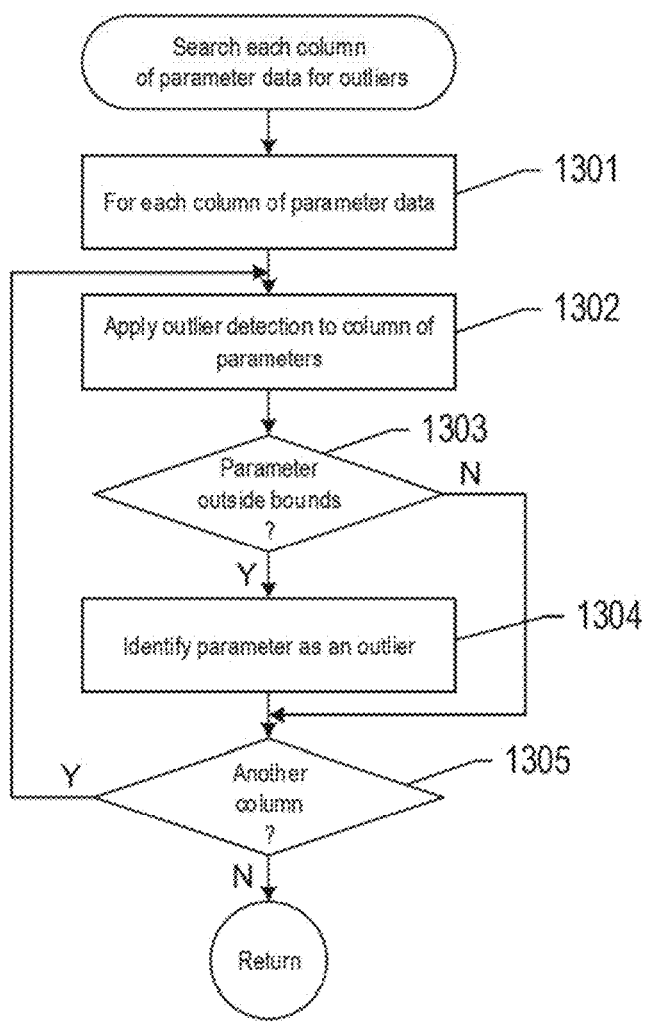
FIG. 13 shows a control-flow diagram of the routine "search each column of parameter data for outliers" called in FIG. 12.

FIG. 13 shows a control-flow diagram of the routine "search each column of parameter data for outliers" called in block 1202 of FIG. 12. A loop beginning with block 1301 repeats the computational operations represented by blocks 1302-1305 for each column of parameter data. In block 1302, outlier is applied to the column of parameter values as described above with reference to FIGS. 4 and 5. In decision block 1303, when a parameter is identified as being outside the minimum or maximum boundaries of a box plot or outside the normalcy intervals as described above with reference to FIGS. 4 and 5 control flows to block 1304. In block 1304, the parameter value is identified as an outlier. In decision block 1305, the operation represented by blocks 1302-1304 are repeated for another column of parameter data.

Figure 14:
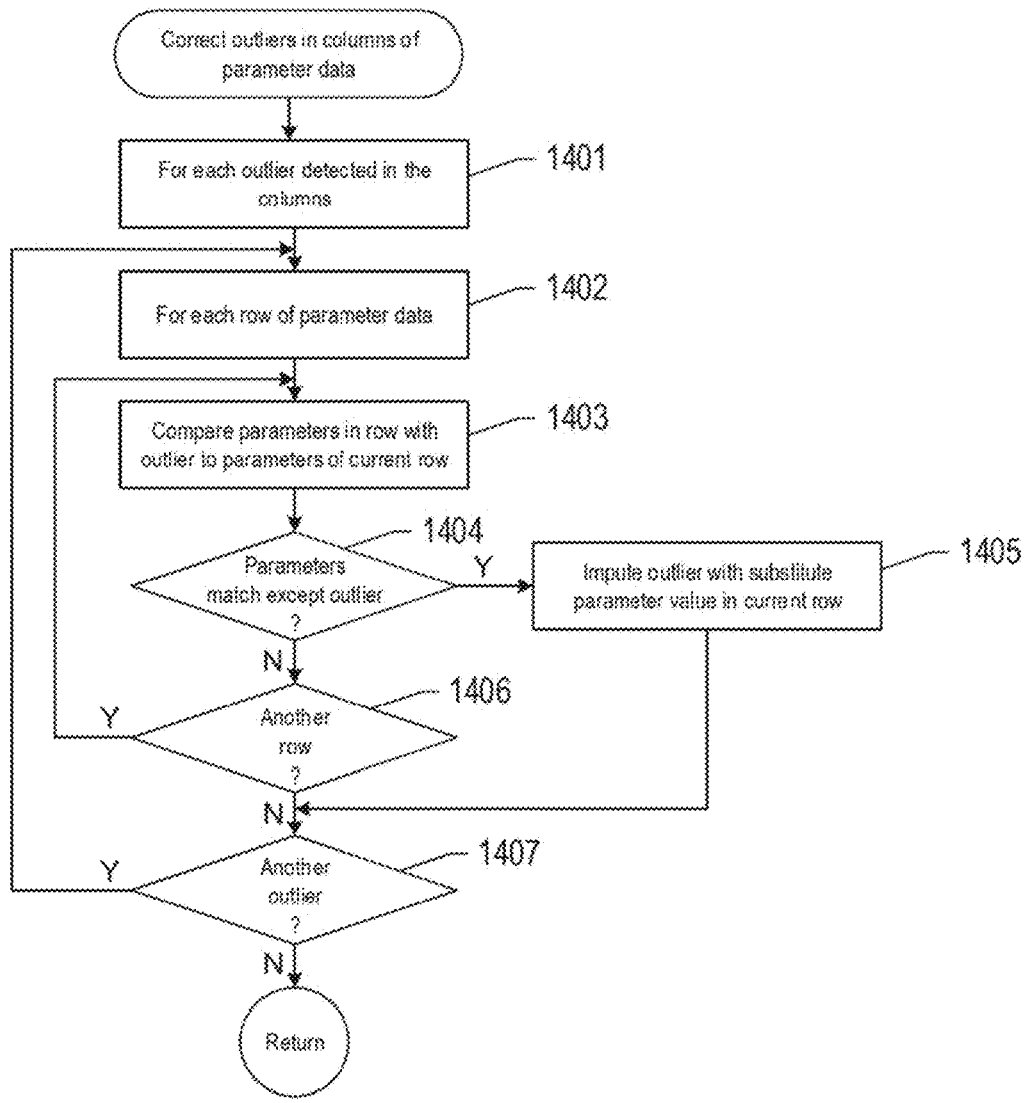
FIG. 14 shows a control-flow diagram of the routine "correct outliers in columns of parameter data" called in FIG. 12.

FIG. 14 shows a control-flow diagram of the routine "correct outliers in columns of parameter data" called in block 1204 of FIG. 12. A loop beginning with block 1401 repeats the computational operations represented by blocks 1402-1407 for each outlier detected in block 1202 of FIG. 12. A loop beginning with block 1402 repeats the computational operations represented by blocks 1403-1406 for each row of the parameter data. In block 1403, parameter values in the row with the outlier are compared with the parameter values in the current row of parameter data, excluding the outlier, as described above with reference to FIGS. 6A-6B. In decision block 1404, when the parameter values of the current row match the parameter values of the row with the outlier, excluding the outlier, control flows to block 1405. In block 1405, the outlier is imputed with a substitute parameter value in the same column as the outlier but in the current row. In decision block 1406, the operations represented by blocks 1403 and 1404 are repeated for another row. In decision block 1407, the operations represented by blocks 1402-1406 are repeated for an outlier.

Figure 15:
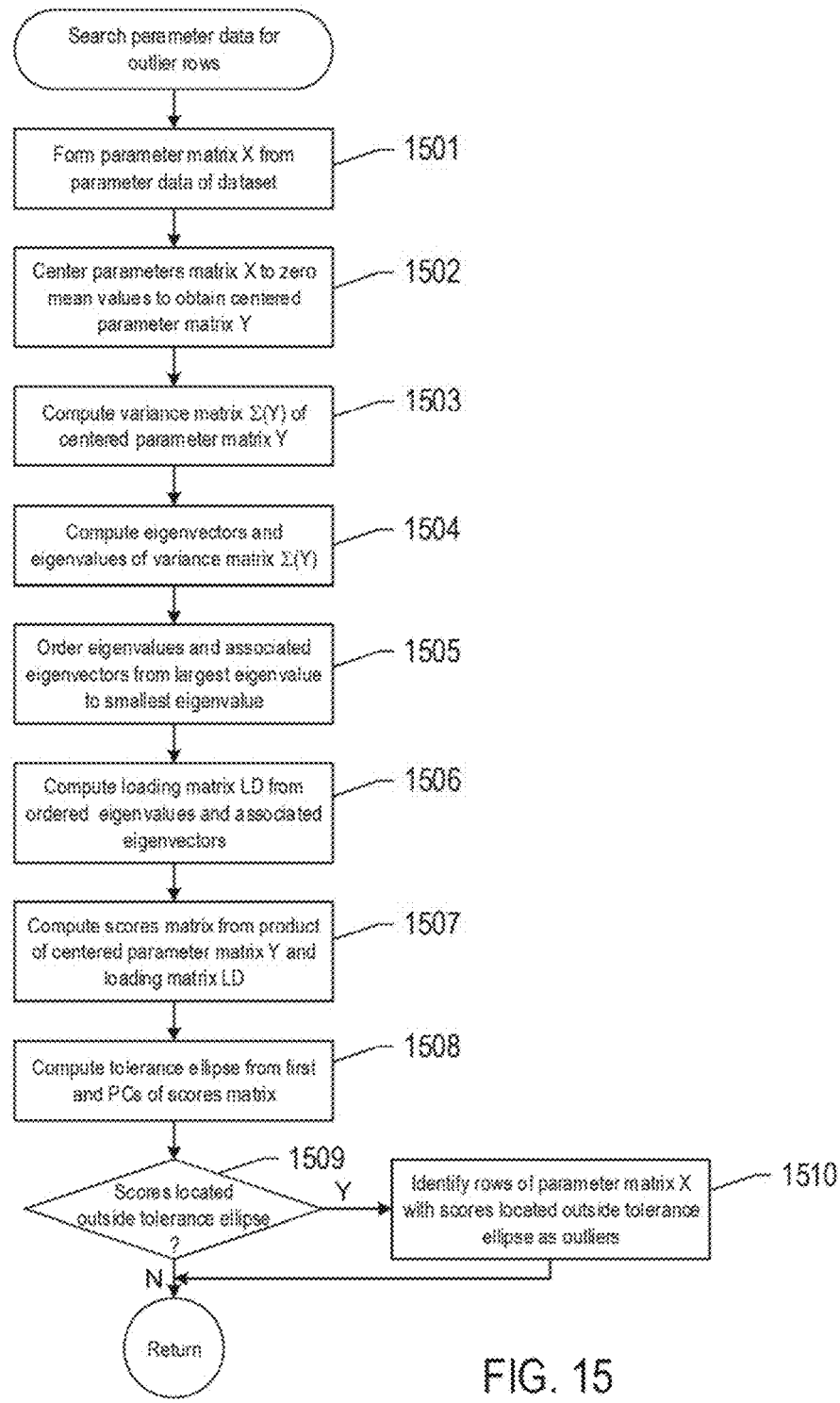
FIG. 15 shows a control-flow diagram of the routine "search parameter data for outlier rows" called in FIG. 12.

FIG. 15 shows a control-flow diagram of the routine "search parameter data for outlier rows" called in block 1205 of FIG. 12. In block 1501, a parameter matrix X is formed from the parameter data of the dataset, as described above with reference to FIG. 7A. In block 1502, the parameter matrix X is centered to obtained a centered parameter matrix Y, as described above with reference to FIG. 7B. In block 1503, a variance matrix $\Sigma(Y)$ is computed from the centered parameter matrix Y, as described above with reference to Equation (5). In block 1504, eigenvectors and eigenvalues are computed for the variance matrix $\Sigma(Y)$, as described above with reference to FIG. 7D. In block 1505, eigenvalues and associated eigenvectors are order from largest eigenvalue to smallest eigenvalue. In block 1506, a loading matrix LD is computed from the ordered eigenvalues and associated eigenvectors, as described above with reference to FIG. 7F. In block 1507, a Scores matrix is computed from a product of the centered parameter matrix Y and the Scores matrix as described above with reference to FIG. 7G. The first and second columns of the Scores matrix are the first and second principle components. In block 1508, a tolerance ellipse of the bivariate points from the first and second principle components of the Scores matrix is computed as described above with reference to Equations (7) and (8). In decision block 1509, rows of the parameter matrix X that correspond to bivariate points located outside the tolerance ellipse are identified as outlier rows. In block 1510, when an outlier row is detected, the rows are identified as outlier rows of the parameter matrix X.

Figure 16:
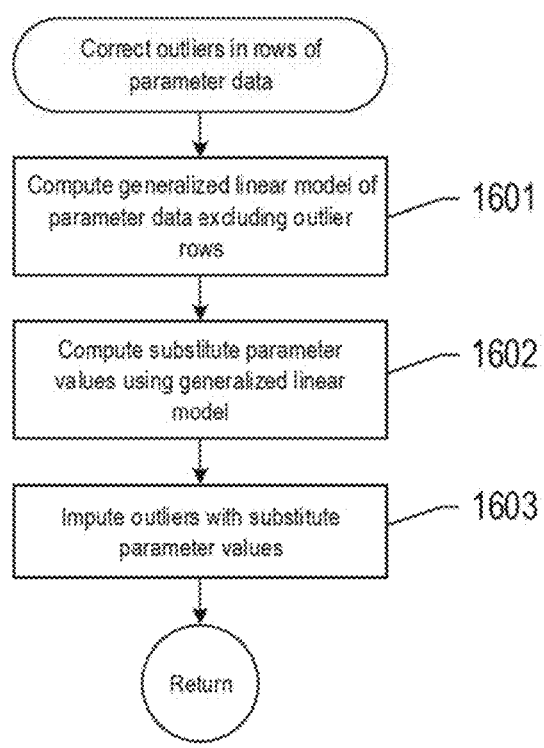
FIG. 16 shows a control-flow diagram of the routine "correct outliers in rows of parameter data" called in FIG. 12.

FIG. 16 shows a control-flow diagram of the routine "correct outliers in rows of parameter data" called in block 1207 of FIG. 12. In block 1601, a generalized linear model of the parameter data, excluding the parameter values in outlier rows is computed using generalized linear regression, as described above with reference to Equation (10). In block 1602, substitute parameter values are computed for outliers in the outlier rows as described above with reference to FIG. 10. In block 1603, outliers are imputed from the substitute parameter values computed in block 1603.

Figure 17:
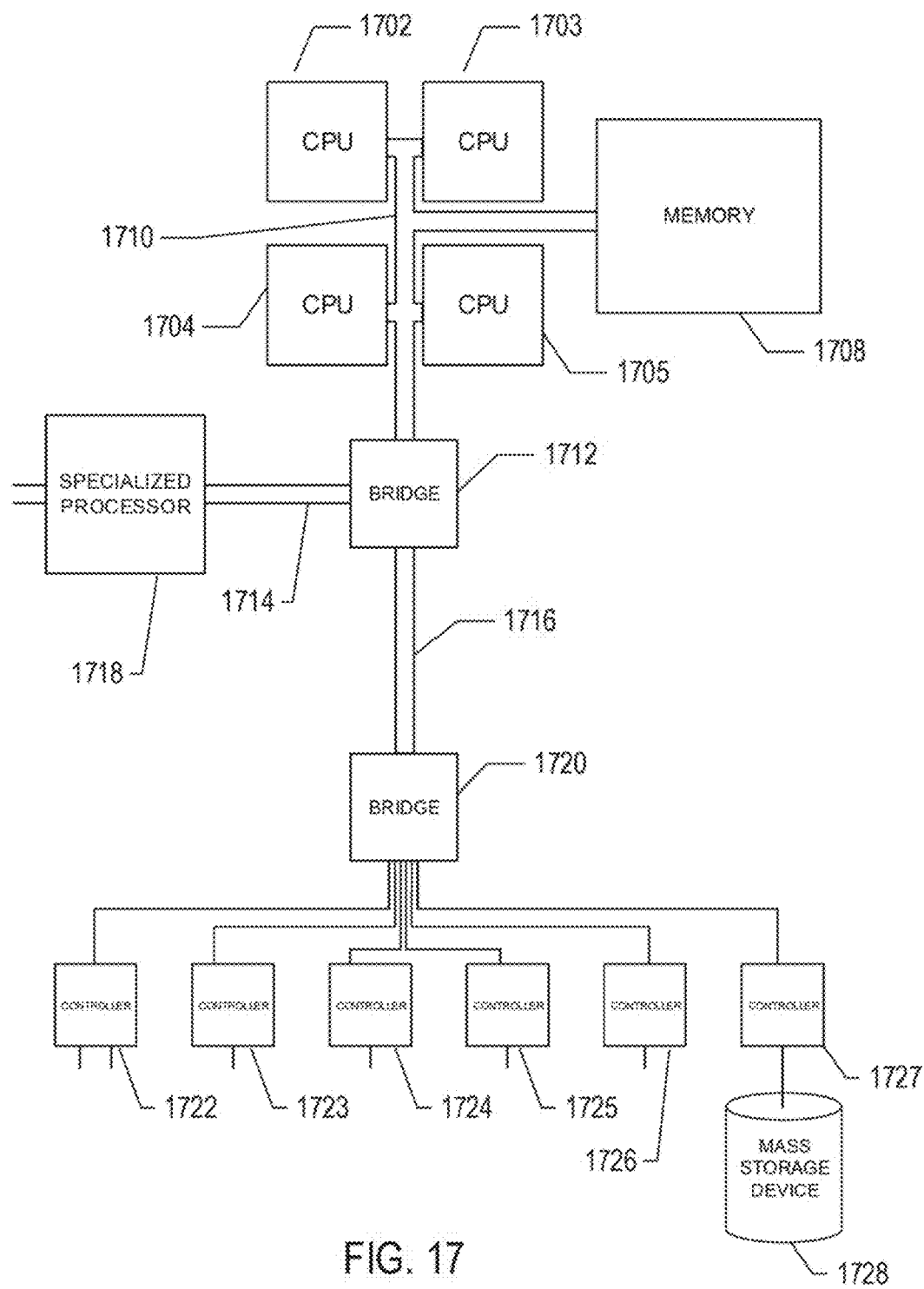
FIG. 17 shows a general architectural diagram for a database management server computer.

FIG. 17 shows a general architectural diagram for a database management server computer used to run the methods described in FIGS. 12-16. The computer system contains one or multiple central processing units ("CPUs") 1702-1705, one or more electronic memories 1708 interconnected with the CPUs by a CPU/memory-subsystem bus 1710 or multiple busses, a first bridge 1712 that interconnects the CPU/memory-subsystem bus 1710 with additional busses 1714 and 1716, or other types of high-speed interconnection media, including multiple, high-speed serial interconnects. These busses or serial interconnections, in turn, connect the CPUs and memory with specialized processors, such as a graphics processor 1718, and with one or more additional bridges 1720, which are interconnected with high-speed serial links or with multiple controllers 1722-1727, such as controller 1727, that provide access to various types of mass data-storage devices 1728, electronic displays, input devices, and other such components, subcomponents, and computational devices. The methods described above are stored in the data-storage devices 1728 and executed by the processing units 1702-1705. It should be noted that computer-readable data-storage devices 1728 include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An automated method stored in one or more data-storage devices and executed using one or more processors to detect and correct outliers in a dataset stored in a data-storage device, the method comprising:
   reading parameter data from the dataset, the parameter data organized with rows and columns of parameter values, each column having the same type of parameter values and each row having different types of parameter values;
   searching each column of the parameter data for outlier parameter values based on the parameter values in the same column;
   searching the parameter data for outlier rows of parameter values based on first and second largest variations in the parameter data;
   determining substitute parameter values for the outlier parameter values based on non-outlier parameter values of the parameter data; and
   displaying the substitute parameter values and the outlier parameter values in a database management user interface that enables a user to selectively accept or reject each of the substitute parameter values for the corresponding outlier parameter values.

2. The method of claim 1 wherein searching each column of the parameter data comprises:
   for each column of parameter values,
      computing one or more normalcy ranges for parameter values in the column;
      detecting parameter values that are outside of the one or more normalcy intervals; and
      identifying parameter values the are outside the one or more normalcy intervals as outlier normalcy values.

3. The method of claim 1 wherein searching the parameter data for outlier rows of parameter values comprises:
   centering the parameter data to a centered parameter matrix based on mean values of each column of the parameter data;
   computing a variance matrix of the centered parameter matrix;
   computing eigenvalues and eigenvectors of the variance matrix;
   computing a loading matrix based on largest and second largest eigenvalues and associated eigenvectors;
   computing a scores matrix based on a product of the centered parameter matrix and the loading matrix;
   computing a tolerance ellipse from scattered bivariate points of the scores matrix, each bivariate point corresponding to a row of parameter values in the parameter data; and
   identifying a row as an outlier row when a corresponding bivariate point is outside the tolerance ellipse.

4. The method of claim 1 wherein determining the substitute parameter values for outlier parameter values based on non-outlier parameter values of the parameter data comprises:
for each outlier parameter value in a column of the parameter data,
determining a row of the parameter data with the outlier parameter value; and
for each row of the parameter data,
comparing parameter values with the parameter values of the row with the outlier parameter value except for the outlier parameter value, and
imputing a substitute parameter value of the row and in the same column as the outlier parameter value for the outlier parameter value, when the parameter values of the row match the parameter values of the row with the outlier parameter value with exception of the outlier parameter.

5. The method of claim 1 wherein determining substitute parameter values for outlier parameter values based on non-outlier parameter values of the parameter data comprises:
computing the generalized linear model of the parameter data with exception of the outlier rows of parameter values using generalized linear regression;
computing substitute parameter values for the outlier parameters using the generalized linear model; and
imputing the substitute parameter values for the outlier parameters.

6. The method of claim 1 wherein displaying the substitute parameter values and the outlier parameter values in the database management user interface that enables the user to selectively accept each of the substitute parameter values for the corresponding outlier parameter values comprises when the user accepts one of the substitute parameter values for the outlier parameter value, replacing the outlier parameter value in the dataset with the substitute parameter value.

7. A system to detect and correct outliers in a dataset stored in a data-storage device, the system comprising:
one or more processors;
one or more data-storage devices; and
machine-readable instructions stored in the one or more data-storage devices that when executed using the one or more processors controls the system to carry out
reading parameter data from the dataset, the parameter data organized with rows and columns of parameter values, each column having the same type of parameter values and each row having different types of parameter values;
searching each column of the parameter data for outlier parameter values based on the parameter values in the same column;
searching the parameter data for outlier rows of parameter values based on first and second largest variations in the parameter data;
determining substitute parameter values for the outlier parameter values based on non-outlier parameter values of the parameter data; and
displaying the substitute parameter values and the outlier parameter values in a database management user interface that enables a user to selectively accept or reject each of the substitute parameter values for the corresponding outlier parameter values.

8. The system of claim 7 wherein searching each column of the parameter data comprises:
for each column of parameter values,
computing one or more normalcy ranges for parameter values in the column;
detecting parameter values that are outside of the one or more normalcy intervals; and
identifying parameter values the are outside the one or more normalcy intervals as outlier normalcy values.

9. The system of claim 7 wherein searching the parameter data for outlier rows of parameter values comprises:
centering the parameter data to a centered parameter matrix based on mean values of each column of the parameter data;
computing a variance matrix of the centered parameter matrix;
computing eigenvalues and eigenvectors of the variance matrix;
computing a loading matrix based on largest and second largest eigenvalues and associated eigenvectors;
computing a scores matrix based on a product of the centered parameter matrix and the loading matrix;
computing a tolerance ellipse from scattered bivariate points of the scores matrix, each bivariate point corresponding to a row of parameter values in the parameter data; and
identifying a row as an outlier row when a corresponding bivariate point is outside the tolerance ellipse.

10. The system of claim 7 wherein determining the substitute parameter values for outlier parameter values based on non-outlier parameter values of the parameter data comprises:
for each outlier parameter value in a column of the parameter data,
determining a row of the parameter data with the outlier parameter value; and
for each row of the parameter data,
comparing parameter values with the parameter values of the row with the outlier parameter value except for the outlier parameter value, and
imputing a substitute parameter value of the row and in the same column as the outlier parameter value for the outlier parameter value, when the parameter values of the row match the parameter values of the row with the outlier parameter value with exception of the outlier parameter.

11. The system of claim 7 wherein determining substitute parameter values for outlier parameter values based on non-outlier parameter values of the parameter data comprises:
computing the generalized linear model of the parameter data with exception of the outlier rows of parameter values using generalized linear regression;
computing substitute parameter values for the outlier parameters using the generalized linear model; and
imputing the substitute parameter values for the outlier parameters.

12. The system of claim 7 wherein displaying the substitute parameter values and the outlier parameter values in the database management user interface that enables the user to selectively accept each of the substitute parameter values for the corresponding outlier parameter values comprises when the user accepts one of the substitute parameter values for the outlier parameter value, replacing the outlier parameter value in the dataset with the substitute parameter value.

13. A non-transitory computer-readable medium encoded with machine-readable instructions that implement a method carried out by one or more processors of a computer system to perform the operations of
    reading parameter data from the dataset, the parameter data organized with rows and columns of parameter values, each column having the same type of parameter values and each row having different types of parameter values;
    searching each column of the parameter data for outlier parameter values based on the parameter values in the same column;
    searching the parameter data for outlier rows of parameter values based on first and second largest variations in the parameter data;
    determining substitute parameter values for the outlier parameter values based on non-outlier parameter values of the parameter data; and
    displaying the substitute parameter values and the outlier parameter values in a database management user interface that enables a user to selectively accept or reject each of the substitute parameter values for the corresponding outlier parameter values.

14. The medium of claim 13 wherein searching each column of the parameter data comprises:
    for each column of parameter values,
        computing one or more normalcy ranges for parameter values in the column;
        detecting parameter values that are outside of the one or more normalcy intervals; and
        identifying parameter values the are outside the one or more normalcy intervals as outlier normalcy values.

15. The medium of claim 13 wherein searching the parameter data for outlier rows of parameter values comprises:
    centering the parameter data to a centered parameter matrix based on mean values of each column of the parameter data;
    computing a variance matrix of the centered parameter matrix;
    computing eigenvalues and eigenvectors of the variance matrix;
    computing a loading matrix based on largest and second largest eigenvalues and associated eigenvectors;
    computing a scores matrix based on a product of the centered parameter matrix and the loading matrix;
    computing a tolerance ellipse from scattered bivariate points of the scores matrix, each bivariate point corresponding to a row of parameter values in the parameter data; and
    identifying a row as an outlier row when a corresponding bivariate point is outside the tolerance ellipse.

16. The medium of claim 13 wherein determining the substitute parameter values for outlier parameter values based on non-outlier parameter values of the parameter data comprises:
    for each outlier parameter value in a column of the parameter data,
        determining a row of the parameter data with the outlier parameter value; and
        for each row of the parameter data,
            comparing parameter values with the parameter values of the row with the outlier parameter value except for the outlier parameter value, and
            imputing a substitute parameter value of the row and in the same column as the outlier parameter value for the outlier parameter value, when the parameter values of the row match the parameter values of the row with the outlier parameter value with exception of the outlier parameter.

17. The medium of claim 13 wherein determining substitute parameter values for outlier parameter values based on non-outlier parameter values of the parameter data comprises:
    computing the generalized linear model of the parameter data with exception of the outlier rows of parameter values using generalized linear regression;
    computing substitute parameter values for the outlier parameters using the generalized linear model; and
    imputing the substitute parameter values for the outlier parameters.

18. The medium of claim 13 wherein displaying the substitute parameter values and the outlier parameter values in the database management user interface that enables the user to selectively accept each of the substitute parameter values for the corresponding outlier parameter values comprises when the user accepts one of the substitute parameter values for the outlier parameter value, replacing the outlier parameter value in the dataset with the substitute parameter value.

* * * * *